(12) United States Patent
Arnold

(10) Patent No.: US 6,522,980 B1
(45) Date of Patent: Feb. 18, 2003

(54) METHOD AND ALGORITHM FOR PREDICTING LEAK RATES

(75) Inventor: William Allen Arnold, Coventry, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 137 days.

(21) Appl. No.: 09/668,116

(22) Filed: Sep. 22, 2000

(51) Int. Cl.$^7$ .................................................. G01F 1/00
(52) U.S. Cl. ............................. 702/45; 702/51; 73/40.7; 73/40; 73/49
(58) Field of Search ....................... 73/45.6, 40, 40.7, 73/45.5, 49, 38; 702/51, 45; 703/8, 9, 2

(56) References Cited

U.S. PATENT DOCUMENTS 5,010,761 A * 4/1991 Cohen et al. ................. 73/40.7
6,146,001 A * 11/2000 Cwiakala ..................... 362/186

* cited by examiner

*Primary Examiner*—John Barlow
*Assistant Examiner*—Stephen J Cherry
(74) *Attorney, Agent, or Firm*—David E Wheeler; Richard B O'Planick

(57) ABSTRACT

A method and algorithm for predicting the fluid loss rate of a system, uses data for the leak rate from the system for a substitute fluid that leaks at a different rate than the system fluid. In the illustrated embodiment, the system is a pneumatic tire and the substitute fluid is helium gas. The helium leak rate data is used in a Fortran program to predict the air loss rate from the tire by determining the leak rate factor f' for helium, as compared to air, and using 'f' to calculate the air loss rate.

11 Claims, 1 Drawing Sheet

METHOD AND ALGORITHM FOR PREDICTING LEAK RATES

REFERENCE TO A SEQUENCE LISTING

A computer program listing appendix "A" on a compact disc is included and the material of the disc incorporated herein by reference. A total of two (2) compact discs are submitted, one original and one duplicate identified as "Copy 1" and "Copy 2" and the single file on each is identified as "2000157Disc". The program was written in FORTRAN 77 and runs on a Unix based SUN computer.

FIELD OF THE INVENTION

The invention relates to a method and algorithm for predicting fluid loss from a system.

BACKGROUND OF THE INVENTION

When pneumatic tires were first invented, maintenance of the tires on a vehicle was a continuing duty of the vehicle operator. Several extra spares were carried at all times, and ensuring the proper inflation of the tires was an almost daily routine.

As tires have developed, it has been a continued goal to build tires that are substantially maintenance free. Toward this goal, better sealing arrangements have been developed between the tire and the rim, better tire valves have been developed, and more flexible less permeable rubbers have been developed. In some better made tires, a liner of butyl rubber (BR) is placed in the inner cavity of the tire to further reduce the air permeability of the tire construction.

Currently, it is common for the vehicle operator to test air pressure in a tire only when a tire looks low, and scheduled maintenance for a passenger tire may require only that the air pressure be checked every one to three months.

In most modern passenger tires, it is considered a defect if a tire loses 3% or more of its inflation pressure per month.

Accordingly, air retention tests have been developed to check how well particular tire builds retain inflation pressure.

Some early air retention tests needed as much as 180 days to complete. By various accelerating techniques, some such tests have been reduced to 60 days.

Even at 60 days, the term of the test is considered by many to be too long, since if there is a defect in the design, or a defect in one of the materials used in the tire, 60 days of tires may be built before the defect is discovered. Because of this, those in the art have been continuously trying to further accelerate air retention testing.

A number of attempts have been made to accelerate air retention testing by substituting helium for air in the test. Helium has a high diffusion rate through rubber, and escapes from a tire much faster than air. In the previous attempts, however, it was only possible to observe the time it took for a tire to go flat when inflated with helium, and no specific data on leakage rates could be obtained.

In copending Application Ser. No. 09/668,115, now U.S. Pat. No. 6,393,897 herewith, the inventor has provided an apparatus that makes possible to use of helium in an accelerated air leakage test, where parameters are observed that make possible the determination of leakage rates.

It is an object of this invention to provide a method and algorithm for calculating air leakage rates for tires, using data from helium leakage from the tires.

Other objects of the invention will be apparent from the following description and claims.

SUMMARY OF THE INVENTION

A method for calculating system fluid loss from a system based on measured fluid loss of a substitute fluid comprises the steps of (a) obtaining data over time for fluid loss of a substitute fluid in a system, (b) using the data to calculate a rate factor f for the substitute fluid which defines the factor by which the leak rate of the substitute fluid is different from the leak rate of the system fluid, (c) using the calculated rate factor f with the gas law equation PV=nRT to calculate the expected system fluid loss in the system. The method may include the further step of comparing the calculated rate factor f with rate factors f determined previously by experiment.

The method can also be used to compare the calculated system fluid loss with a predetermined value.

In more sophisticated embodiments of the invention, the method may include the further step of providing a first signal if the calculated value is acceptable as compared to the predetermined value, and providing a second signal if the calculated value is not acceptable as compared to the predetermined value.

The method may include the further steps of (a) calculating data for the substitute fluid for loss per month, change in concentration with time, pressure, system inner volume, system outer volume, and container volume, as well as, when the test object is a tire, calculating data for liner butyl rubber (BR) content, distance of the liner ending from the toe of the tire, and the liner gauge.

The method may include the further step of calculating a mean factor for f, and calculating build to build differences by convergence and optimizing slopes. The mean actor f provides a basis of comparison when one accounts for liner composition, gauge and ending position when the system is a pneumatic tire.

The method may include outputting measurements for the substitute fluid and the prediction for the system fluid.

A specific algorithm to carry out the method is also provided.

DESCRIPTION OF THE DRAWING

FIG. 1 discloses in block diagram form the subject method 10. Data is obtained identifying the fluid loss rate of substitute fluid (preferably helium) at 12 from a tire system enclosed within a test chamber (not shown). The tire system includes a conventionally formed test tire having conventional tire structural parameters such as an inner and outer volume and a liner disposed adjacent to the tire cavity. The data obtained includes (14) the substitute fluid loss rate (per month); pressure of the substitute fluid within the tire system; the inner and outer volume of the tire system; and the container volume. In addition, the liner includes liner specific structural parameters (16) such as the liner material content, and its butyl content, the end point of the liner relative to the toe, and the liner gauge. Such liner parameters 16 and the tire parameters 14 are variable and the data 12 obtained for substitute fluid loss is a function of the parameters of the tested tire system.

Figure 1:
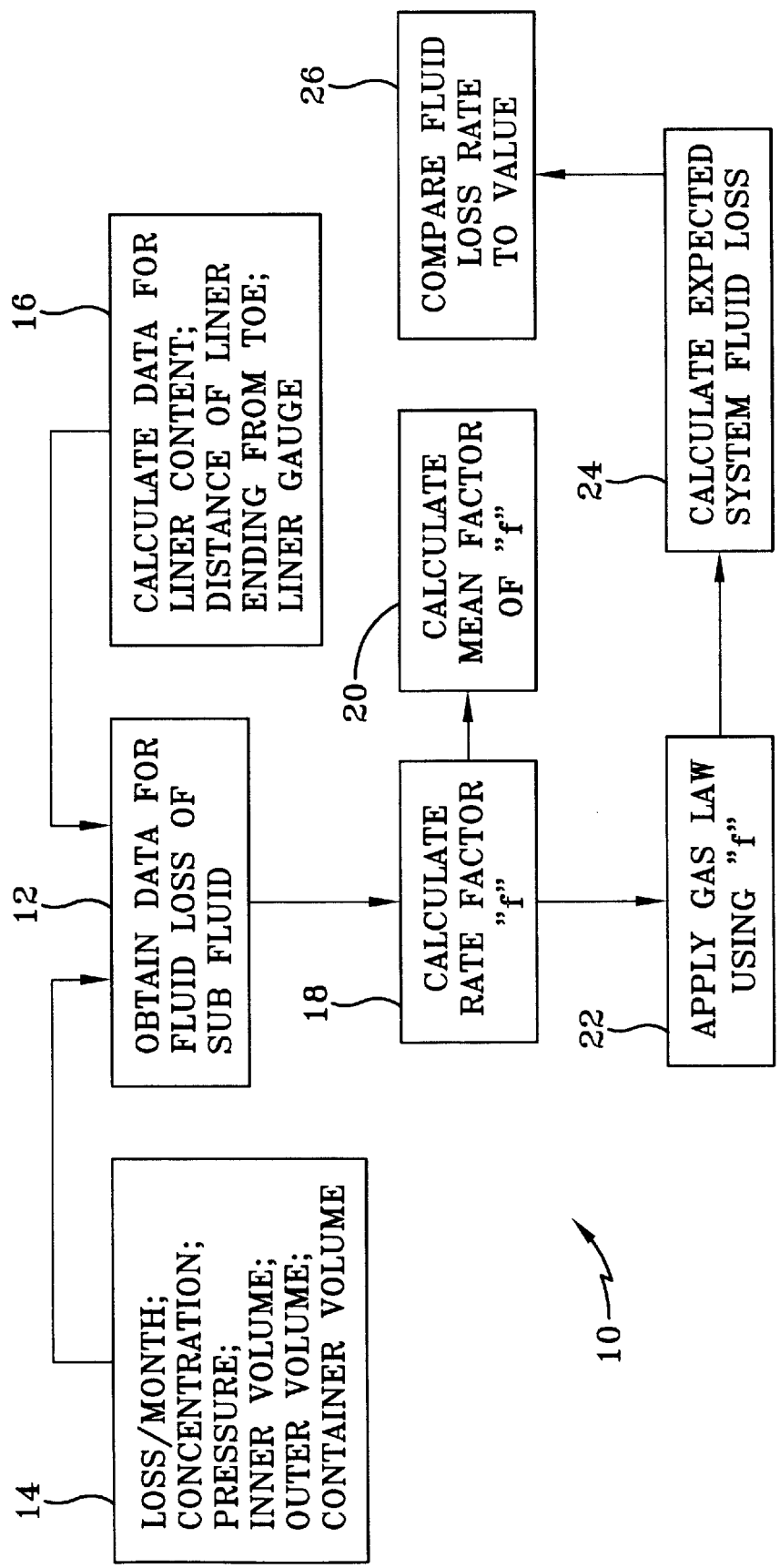
FIG. 1 discloses in block diagram form the subject method. .

A rate factor f is calculated (18) based upon the substitute fluid loss rate (dC/dt) empirically determined. A mean of measured factors f may be determined (20). The gas law and certain tire parameter data are applied (22) using the value f to calculate (24) the expected system fluid loss rate. The system fluid loss rate is then compared against predetermined value(s) (26).

DETAILED DESCRIPTION OF THE INVENTION

In an illustrated embodiment, an experimental set-up was made to measure the helium leak rate in tires. The set-up consists of a helium sniffer (mass spectrometer) and an airtight aluminum vessel. A tire filled with helium can be placed into the vessel and the dilute helium concentration in the vessel can be measured as the tire off-gasses. The helium concentration build-up rate can then be used to predict an air leak rate. In order to make this prediction, it must be known how much faster than air the helium leaks out.

In the illustrated method of the invention, helium is used as a substitute for air for inflating a tire to be tested. Those skilled in the art will recognize that the method and algorithm can be used for other test fluids in testing other systems.

Data for the leakage rate of helium from a test tire is collected, and the algorithm of the invention reads a data base that holds measured air leak rates and helium build up rates (for the helium buildup in the container), and then calculates the air leak rate in a tire in which only a helium buildup rate has been measured.

The data collected, and the input needed to make an accurate calculation, relate to the change of concentration of helium with time in the test chamber, the pressure in the tire, the inner volume of the tire, the outer volume of the tire, the volume of the test chamber, the liner butyl concentration, liner gauge, and liner ending position.

The overall volume of the test chamber is substantially constant after it is built, but the test volume is the overall volume less the exterior volume of a tire that may be placed in the chamber. And the exterior volume of the tire will change with tire size and tread pattern, as well as other factors having to do with the construction of the tire.

It has been found that helium reaches a substantially steady state of diffusion from a tire after about two days, and when the steady state rate dC/dt is determined, the amount of diffusion over a one-month period can be calculated.

The one-month period is used to correlate data with the leakage standards set up by auto manufacturers.

The concentration of He in the test chamber affects the equilibrium of the contained gases in the test (i.e., the gases in the test chamber and the gases contained in the tire in the test chamber).

In a specific tire construction, the amount of BR used in the liner of the tire, and the distance from the liner ending to the toe of the tire have an effect on the diffusion rate.

The f for the tire describes how much faster than air that helium leaks from the tire. When f is known, a predicted air loss rate can be calculated by:

$$b^* = (dC/dt)\left[\frac{(V_C - V_E)RT}{PFV_I}\right]$$

wherein
dC/dt is the concentration build-up rate of the test fluid in the container,
$V_C$ is the volume of the container,
$V_E$ is the external volume of the system,
R is the gas constant,
T is temperature in Kelvin,
P is the absolute pressure of test fluid in the system,
f is the factor that test fluid is leaking different than the system fluid, and
$V_I$ is the systems' internal volume.

See copending DN2000-102, filed of even date herewith, for an illustration of the apparatus used, and a further example of the method of the invention.

By collecting data daily, and calculating the rates day to day, the end of the test, and the reaching of a steady state, will be recognized by the technician when two or more consecutive calculations of the rate are the same, or are within a specified limit.

In further embodiments of the invention, the algorithm can be used to provide a numerical comparison between two builds of the same tire by calculating a new air loss rate (a new b, i.e. the fraction of air lost per day or month) for a second tire build.

The air retention testing models the internal pressure by:

$$P = P_o\, e^{-bt}$$

where b is the air loss rate reported as fraction/day, and $P_o$ is the initial gauge pressure. The hypothesis that air will leak out at a certain factor 'f' faster than air implies a helium retention model:

$$P = P_o\, e^{-fbt}$$

Because the helium partial pressure is near zero in air, however, $P_o$ in the helium retention model is the absolute pressure. The factor 'f' is then given by:

$$f = (dC/dt)[(V_C - V_E)RT/PbV_I].$$

For the illustrated embodiment where a the system is a pneumatic tire, 'f' is a function of the liner butyl content, gauge, and the liner ending point. The predicted air loss rate (b*) is then given by $$b^* = (dC/dt)[(V_C - V_E)RT/PfV_I]$$

In Order to minimize $\Sigma(b^* - b)^2/b$ using the database, a value of 'f' is determined and stored.

The least squares of the data points can be calculated to confirm the accuracy and consistency of the data.

The algorithm can be used to provide output for measurement of the leak rate and the air leak prediction.

The invention is further illustrated with reference to a specific algorithm which can be used to collect and collate the data, calculate the helium leak rate and calculate the air leak rate. The program is illustrated in the following example. The program in the example is the Copyright of the Goodyear Tire & Rubber Company, 1999,2000.

Those skilled in the programming art will find the program to be substantially self-explanatory.

While the invention has been specifically illustrated and described, those skilled in the art will recognize that the invention may be variously modified and practiced without departing from the spirit of the invention. The invention is limited only by the following claims.

What is claimed is:
1. A method for calculating system fluid loss from a tire system based on measured fluid loss of a substitute fluid from the tire system, the tire system comprising a tire having structural parameters including a tire inner volume and a tire outer volume, the method comprising the steps of:

(a) obtaining data identifying a fluid loss rate of the substitute fluid from the tire system;

(b) using the data to calculate a rate factor f for the substitute fluid which defines the factor by which the leak rate of the substitute fluid is different from the leak rate of the system fluid;

(c) using the rate factor f with the gas law equation PV=nRT and the tire structural parameters to calculate the expected tire system fluid loss in the tire system.

2. The method of claim 1 which includes the further step of comparing the calculated system fluid loss with a predetermined value.

3. The method of claim 2 which includes the further step of providing a first signal if the calculated value is acceptable as compared to the predetermined value, and providing a second signal if the calculated value is not acceptable as compared to the predetermined value.

4. The method of claim 1 wherein step (a) includes obtaining data for the substitute fluid, including the substitute fluid loss rate, change in concentration of the substitute fluid within the chamber with time, pressure, system inner volume, system outer volume, and chamber volume.

5. The method of claim 1 which further includes obtaining data representing the substitute fluid leak rate as a function of variable liner parameters including liner butyl rubber (BR) content, distance of the liner ending from the toe, and liner gauge; using the data to calculate a rate factor f for the substitute fluid as a function of the variable liner parameters, and using the calculated rate factors f with the gas law equation to calculate the expected tire system fluid loss in the system as a function of the liner parameters.

6. The method of claim 1 which comprises the further step of calculating a mean factor for f.

7. The method of claim 1 which comprises the further step of calculating tire build to build differences in the system fluid loss rate due to variation in the tire structural parameters.

8. The method of claim 1 which comprises the further steps of outputting measurements for the substitute fluid and the prediction for the system fluid.

9. A method for calculating system fluid loss from a tire system based on measured fluid loss of a substitute fluid from the tire system, the tire system comprising a tire having measurable structural parameters including a tire inner volume, a tire outer volume, and pressure, the method comprising the steps of:

(a) positioning the tire system containing the substitute fluid within a test chamber;

(b) obtaining data identifying a substitute fluid loss rate from the tire system into the chamber;

(c) using the data to calculate a rate factor f for the substitute fluid which defines the factor by which the leak rate of the substitute fluid is different from the leak rate of the system fluid;

(d) using the calculated rate factor f with the gas law equation PV=nRT to calculate the expected tire system fluid loss in the tire system.

10. The method of claim 9, wherein the tire system further including a liner having measurable liner parameters including liner material composition; a position of the liner end point; and liner gauge, the method further includes:

varying at least one of the liner parameters and obtaining data identifying a substitute fluid loss rate as a function of the varied liner parameter;

using the data to calculate a rate factor f for the substitute fluid as a function of the varied liner parameter; and using the calculated rate factor f to calculate the expected system fluid loss in the tire system as a function of the varied liner parameter.

11. The method of claim 9 which further includes:

varying at least one of the tire structural parameters and obtaining data identifying a substitute fluid loss rate as a function of the varied liner parameter;

using the data to calculate a rate factor f for the substitute fluid as a function of the varied tire structural parameter; and using the calculated rate factor f to calculate the expected system fluid loss in the tire system as a function of the varied tire structural parameter.

* * * * *